United States Patent
Choi et al.

(10) Patent No.: US 11,408,500 B2
(45) Date of Patent: Aug. 9, 2022

(54) APPARATUS AND METHOD FOR TEMPERATURE CONTROL OF TRANSMISSION FLUID, AND VEHICLE SYSTEM

(71) Applicants: Hyundai Motor Company, Seoul (KR); Kia Motors Corporation, Seoul (KR)

(72) Inventors: Jae Young Choi, Seoul (KR); Hoon Han, Gyeonggi-do (KR); Jee Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 296 days.

(21) Appl. No.: 16/658,890

(22) Filed: Oct. 21, 2019

(65) Prior Publication Data
US 2020/0292051 A1 Sep. 17, 2020

(30) Foreign Application Priority Data
Mar. 11, 2019 (KR) .......................... 10-2019-0027666

(51) Int. Cl.
*F16H 57/04* (2010.01)

(52) U.S. Cl.
CPC ..... *F16H 57/0413* (2013.01); *F16H 57/0475* (2013.01)

(58) Field of Classification Search
CPC .. F16H 57/0413; F16H 57/0475; F16H 41/30; F16H 2061/0015; F16H 2061/0037; F16H 57/0415; F16H 59/64; F16H 59/72; F16H 59/78; F15B 21/042; B60L 58/12; B60W 10/30; B60W 20/13; F01P 7/14; F01P 2060/18; B60Y 2200/92
USPC ........................................................... 701/36
See application file for complete search history.

(56) References Cited

U.S. PATENT DOCUMENTS

| 2015/0183296 A1* | 7/2015 | Ragazzi | B60H 1/034 219/205 |
| 2016/0138878 A1* | 5/2016 | Gopal | F01P 7/165 165/103 |
| 2019/0348724 A1* | 11/2019 | Satoh | H02J 7/00 |

* cited by examiner

*Primary Examiner* — Joseph J Dallo
*Assistant Examiner* — Yi-Kai Wang
(74) *Attorney, Agent, or Firm* — Fox Rothschild LLP (57) ABSTRACT

An apparatus and method for controlling temperature of automatic transmission fluid, and a vehicle system are provided. The apparatus includes a determination device that determines whether a temperature difference between the temperature of the automatic transmission fluid and a target temperature thereof satisfies a heating control condition of the automatic transmission fluid at the start of charging. A then adjusts the temperature of the automatic transmission fluid by outputting an operation control signal for at least one driving unit of a thermal management system, when the temperature difference satisfies the heating control condition of the automatic transmission fluid.

19 Claims, 6 Drawing Sheets

APPARATUS AND METHOD FOR TEMPERATURE CONTROL OF TRANSMISSION FLUID, AND VEHICLE SYSTEM

CROSS-REFERENCE TO RELATED APPLICATION

This application claims the benefit of priority to Korean Patent Application No. 10-2019-0027666, filed in the Korean Intellectual Property Office on Mar. 11, 2019, the entire contents of which are incorporated herein by reference.

TECHNICAL FIELD

The present disclosure relates to an apparatus and method for temperature control of automatic transmission fluid, and a vehicle system, and more particularly, to an apparatus and method for temperature control of automatic transmission fluid that are capable of increasing the temperature using minimum energy.

BACKGROUND

An automatic transmission uses automatic transmission fluid (hereinafter, referred to as "ATF") to transmit the power of a vehicle power source, such as an engine or a motor, to a drive axle. The ATF is used as a working fluid for transmitting power in a torque converter of the automatic transmission. In addition, the ATF is used to lubricate and cool parts such as a gear and a bearing and is also used as a working fluid for a clutch, a brake, a valve body, and the like.

For low-temperature or cold driving, the temperature of the ATF is low, and therefore the operation efficiency of the ATF is deteriorated. In particular, when the temperature of the ATF is low, friction increases in a part using the ATF with an increase of the fluid viscosity, and hence vehicle fuel economy is decreased. An ATF warmer is an apparatus aimed at reducing friction and improving vehicle fuel economy by heating the ATF. When the temperature of the ATF is low, the ATF warmer heats the ATF to decrease the fluid viscosity thereof, thereby reducing friction and improving vehicle fuel economy correspondingly.

In a charge sustaining (CS) mode in which a plug-in hybrid electric vehicle (PHEV) travels using an internal combustion engine while maintaining a battery, likewise to a hybrid electric vehicle (HEV) or a gasoline vehicle in the related art, the PHEV increases the temperature of ATF with an ATF warmer using engine heat, thereby improving the efficiency of an automatic transmission. However, in a charge depleting (CD) mode in which the PHEV travels using electricity produced by consuming the battery, a heat generation source outside the automatic transmission is restrictive, and therefore the PHEV is disadvantageous in terms of the efficiency of the automatic transmission. Furthermore, when the vehicle travels at high speed and low APS (accelerator pedal sensor), the temperature of the ATF may be decreased by a headwind.

SUMMARY

The present disclosure provides an ATF temperature control apparatus and method and a vehicle system, in which an on-board charger (OBC) is mounted in a powertrain thermal management system and the temperature of ATF is increased using heat generated from the OBC during charging, whereby the temperature of the ATF may be increased using minimum energy, and the efficiency of an automatic transmission may be increased when a vehicle travels after a battery thereof is fully charged.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling temperature of automatic transmission fluid may include a determination device configured to determine whether a temperature difference between the temperature of the automatic transmission fluid and a target temperature thereof satisfies a heating control condition of the automatic transmission fluid at the start of charging and a controller configured to adjust the temperature of the automatic transmission fluid by outputting an operation control signal for at least one driving unit of a thermal management system, when the temperature difference satisfies the heating control condition of the automatic transmission fluid.

The thermal management system may be a powertrain thermal management system. The powertrain thermal management system may include a positive temperature coefficient (PTC) heater, an electric oil pump (EOP), a water pump for a heater, and an automatic transmission fluid (ATF) warmer and may further include an on-board charger (OBC) connected between the PTC heater and the ATF warmer to generate heat during the charging. The determination device may be configured to determine that a first step heating condition is satisfied, when the temperature difference exceeds a first set value and is lower than or equal to a second set value.

The controller may be configured to generate a heating control signal including an instruction for turning off a PTC heater of the thermal management system and turning on an electric oil pump (EOP) and a water pump for a heater of the thermal management system and may be configured to transmit the heating control signal to the thermal management system, when the first step heating condition is satisfied. The determination device may be configured to determine that a second step heating condition is satisfied, when the temperature difference exceeds a second set value. The controller may be configured to generate a second step heating control signal including an instruction for turning on a PTC heater, an electric oil pump (EOP), and a water pump for a heater of the thermal management system and may be configured to transmit the second step heating control signal to the thermal management system, when the second step heating condition is satisfied.

Additionally, the controller may be configured to determine a rate of use of the PTC heater based on an outside-air temperature and a state of charge (SOC). The controller may be configured to determine the rate of use of the PTC heater to be 100% or a first value, when the outside-air temperature is less than a reference temperature. The controller may be configured to determine the rate of use of the PTC heater to be a second value lower than a first value, when the outside-air temperature is greater than or equal to a reference temperature and the state of charge (SOC) is greater than or equal to a reference value. In addition, the controller may be configured to determine the rate of use of the PTC heater to be a third value lower than a second value, when the outside-air temperature is greater than or equal to a reference temperature and the state of charge (SOC) is less than a reference value.

The determination device may be configured to determine that a cooling condition of an on-board charger (OBC) is satisfied, when the temperature difference is less than a first set value. The controller may be configured to generate a cooling control signal including an instruction for turning off a PTC heater and an electric oil pump (EOP) of the thermal management system and turning on a water pump for a heater of the thermal management system and transmit the cooling control signal to the thermal management system, when the cooling condition is satisfied.

According to another aspect of the present disclosure, a method for controlling temperature of automatic transmission fluid may include determining whether a temperature difference between the temperature of the automatic transmission fluid and a target temperature thereof satisfies a heating control condition of the automatic transmission fluid at the start of charging and adjusting the temperature of the automatic transmission fluid by outputting an operation control signal for at least one driving unit of a thermal management system, when the temperature difference satisfies the heating control condition of the automatic transmission fluid.

According to another aspect of the present disclosure, a vehicle system may include a powertrain thermal management system having a positive temperature coefficient (PTC) heater, an electric oil pump (EOP), a water pump for a heater, an automatic transmission fluid (ATF) warmer, and an on-board charger (OBC) connected between the PTC heater and the ATF wanner and an ATF temperature control apparatus configured to determine whether a temperature difference between a temperature of automatic transmission fluid and a target temperature thereof satisfies a heating control condition of the automatic transmission fluid at the start of charging and adjust the temperature of the automatic transmission fluid by outputting an operation control signal for at least one driving unit of the powertrain thermal management system, when the temperature difference satisfies the heating control condition of the automatic transmission fluid.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
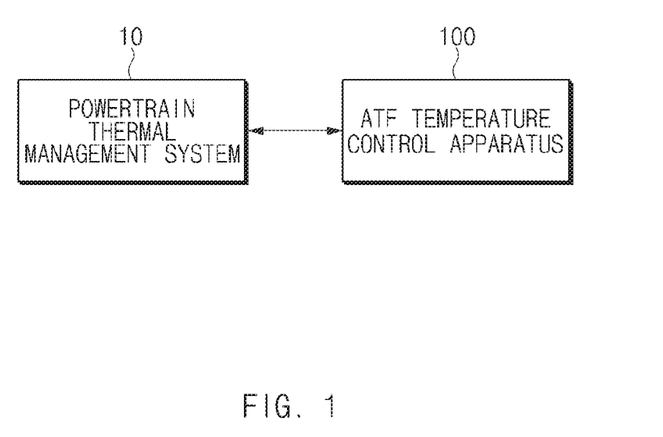
FIG. 1 is a view illustrating a configuration of a vehicle system according to an exemplary embodiment of the present disclosure.

FIG. 1 is a view illustrating a configuration of a vehicle system according to an exemplary embodiment of the present disclosure. Referring to FIG. 1, the vehicle system may include a powertrain thermal management system 10 and an ATF temperature control apparatus 100. The powertrain thermal management system 10 may include an engine thermal management system that forms a circulation flow of cooling water around an engine and a transmission thermal management system that forms a circulation flow of ATF around an automatic transmission.

Figure 2:
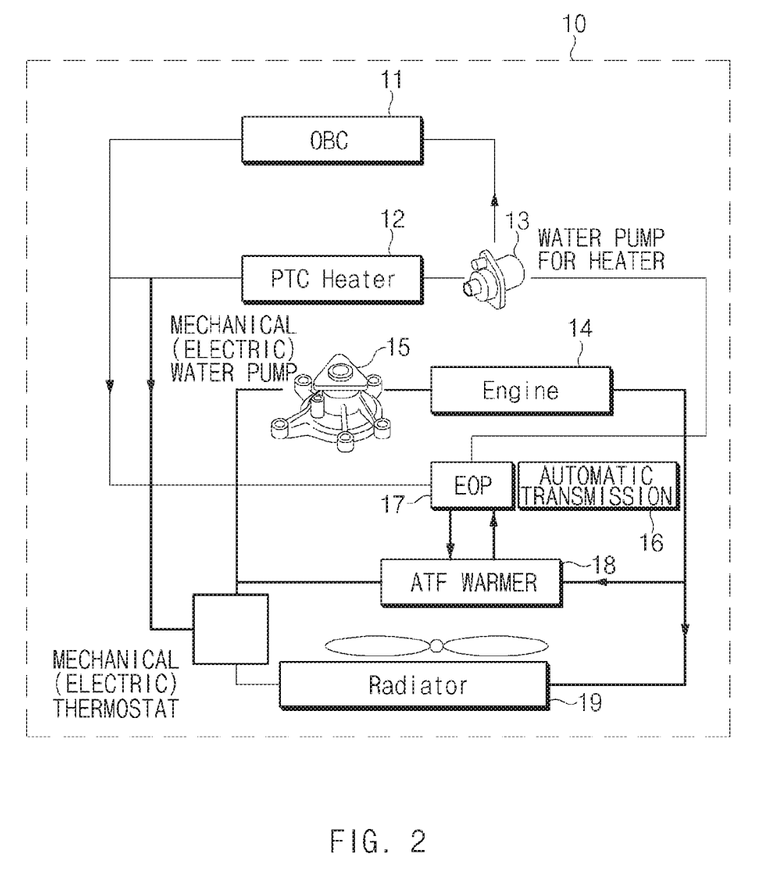
FIG. 2 is a view illustrating a configuration of a powertrain thermal management system according to an exemplary embodiment of the present disclosure.

Referring to FIG. 2, the powertrain thermal management system 10 may include a positive temperature coefficient (PTC) heater 12, a water pump 13 for a heater, an engine 14, a water pump 15, an automatic transmission 16, an electric oil pump (EOP) 17, an ATF warmer 18, and a radiator 19. In addition, the powertrain thermal management system 10 may further include an on-board charger (OBC) 11. The water pumps 13 and 15 circulate cooling water in a circulation line of the powertrain thermal management system 10, and the EOP 17 circulates ATF in a circulation line of the powertrain thermal management system 10. The ATF warmer 18 may be configured to increase the temperature of the ATF through heat exchange between the engine cooling water and the ATF. The radiator 19 may be configured to cool the cooling water by releasing heat from the cooling water.

The powertrain thermal management system 10 may connect the PTC heater 12 and the ATF warmer 18 or an ATF oil chamber and may be configured to operate the EOP 17 to increase the temperature of the ATF. At this time, the PTC heater 12 and the EOP 17 may be operated using charging energy. The OBC 11 may be configured to convert alternating current (AC) from a charger outside a vehicle to direct current (DC) and supply the direct current to a battery. Since the OBC 11 generates heat while charging the battery, the powertrain thermal management system 10 connects the OBC 11 between the PTC heater 12 and the ATF warmer 18 or the ATF oil chamber and may be configured to increase the temperature of the ATF while minimizing energy usage, by using the heat generated from the OBC 11 during the charging.

When an electric vehicle, a hybrid electric vehicle (HEV), or a plug-in hybrid electric vehicle (PHEV) operates in an electric mode and a motor provides a main power source, the ATF temperature control apparatus 100 may be configured to adjust the temperature of the ATF based on a preset target temperature, the temperature of the ATF, an outside-air temperature, and/or a state of charge (SOC) when the battery of the vehicle starts to be charged.

Figure 3:
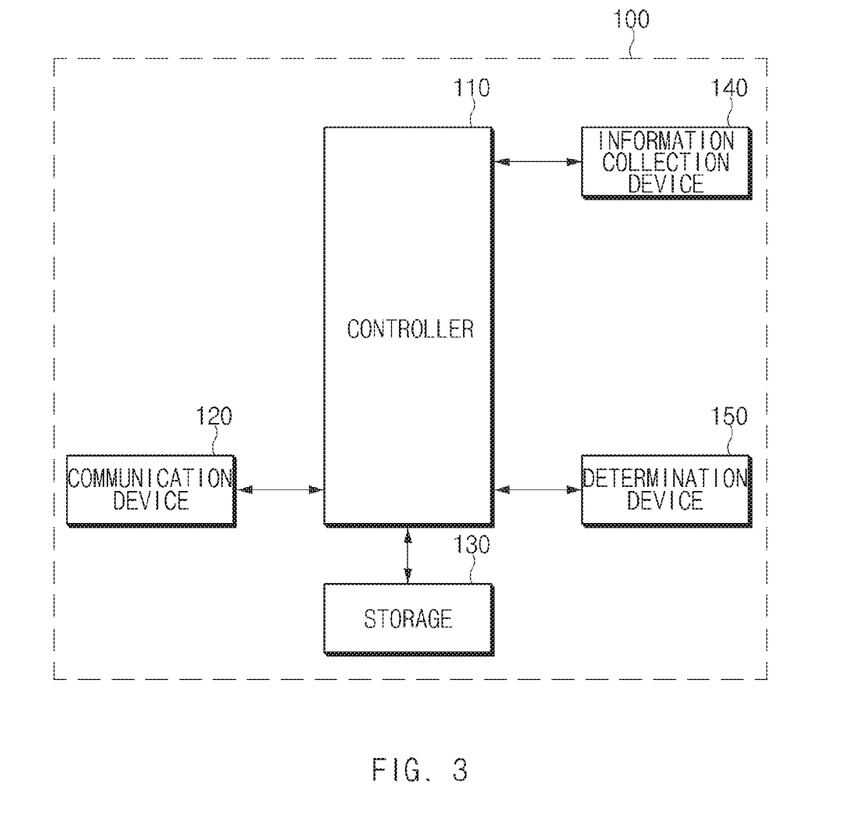
FIG. 3 is a view illustrating a configuration of an apparatus for controlling the temperature of ATF according to an exemplary embodiment of the present disclosure.

Hereinafter, a detailed configuration and operations of the ATF temperature control apparatus 100 will be described with reference to FIG. 3. Referring to FIG. 3, the ATF temperature control apparatus 100 may include a controller 110, a communication device 120, storage 130, an information collection device 140, and a determination device 150.

In particular, the controller 110, the information collection device 140, and the determination device 150 of the ATF temperature control apparatus 100 according to this exemplary embodiment may be implemented as at least one processor.

The controller 110 may be configured to process signals transferred between the components of the ATF temperature control apparatus 100. The communication device 120 may include a communication module for in-vehicle network communication with electronic units and/or controllers included in the vehicle. For example, the communication module may be configured to receive the temperature of the ATF, an outside-air temperature, and/or state of charge (SOC) information from sensors mounted within the vehicle. The in-vehicle network communication technology may include controller area network (CAN) communication, local interconnect network (LIN) communication, Flex-Ray communication, or the like.

Furthermore, the communication device 120 may include a module for wireless Internet connection or a communication module for short range communication. The storage 130 may be configured to store data and/or an algorithm required for the ATF temperature control apparatus 100 to operate. For example, the storage 130 may be configured to store information regarding a target temperature of the ATF and store the temperature of the ATF, the outside-air temperature, and/or the SOC information received via the communication device 120. In addition, the storage 130 may be configured to store condition information for heating control of the ATF and/or cooling control of the OBC 11 and store an instruction and/or an algorithm for the heating or cooling control.

Particularly, the storage 130 may include a storage medium such as a random access memory (RAM), a static random access memory (SRAM), a read-only memory (ROM), a programmable read-only memory (PROM), or an electrically erasable programmable read-only memory (EEPROM). Further, the information collection device 140 may be configured to collect information of conditions for temperature control when the battery of the vehicle starts to be charged. For example, the information collection device 140 may be configured to collect the target temperature information of the ATF stored in the storage 130 and collect the temperature of the ATF, the outside-air temperature, and/or the SOC information collected via the communication device 120.

The determination device 150 may be configured to determine whether a condition for heating control or cooling control is satisfied, based on the information collected by the information collection device 140 and transfer the determination result to the controller 110. First, the determination device 150 may be configured to determine whether the temperature difference between the target temperature of the ATF and the temperature of the ATF is less than a first set value. For example, the first set value may be set to about −10° C. When the temperature difference is less than the first set value, the determination device 150 may be configured to determine that a cooling control condition is satisfied, and transmit a first signal to the controller 110.

The determination device 150 may be configured to determine whether the temperature difference exceeds the first set value. When the temperature difference exceeds the first set value, the determination device 150 may be configured to determine that a heating control condition is satisfied. Additionally, the determination device 150 may be configured to determine whether the temperature difference exceeds a second set value. When the temperature difference exceeds the first set value and is less than or equal to the second set value, the determination device 150 may be configured to determine that a first step heating control condition is satisfied and transmit a second signal to the controller 110. When the temperature difference exceeds the second set value, the determination device 150 may be configured to determine that a second step heating control condition is satisfied and transmit a third signal to the controller 110.

Furthermore, when the second step heating control condition is satisfied, the determination device 150 may be configured to compare the outside-air temperature and the SOC with reference values and transmit the comparison result together to the controller 110. Meanwhile, when the temperature difference corresponds to the first set value, the determination device 150 may be configured to determine that the heating control condition or the cooling control condition is not satisfied and transmit a fourth signal to the controller 110.

When the first signal is received from the determination device 150, the controller 110 may be configured to determine that the temperature of the ATF is high (e.g., excessive), and generate and transmit a cooling control signal of the OBC 11 to the powertrain thermal management system 10. In particular, the cooling control signal may include an instruction for turning off the PTC heater 12 and the EOP 17 and turning on the water pump 13 for the heater. Accordingly, the powertrain thermal management system 10 may be configured to turn off the PTC heater 12 and the EOP 17 and turn on only the water pump 13 for the heater according to the cooling control signal from the controller 110. Since the temperature of the ATF is high, the OBC 11 may be cooled through the radiator 19 as the water pump 13 for the heater is turned on. As a result, the temperature of the ATF may be prevented from being increased.

When the second signal is received from the determination device 150, the controller 110 generates a first step heating control signal for raising the temperature of the ATF to a first step and transmits the first step heating control signal to the powertrain thermal management system 10. Here, the first step heating control signal may include an instruction for turning off the PTC heater 12 and turning on the EOP 17 and the water pump 13 for the heater. Accordingly, the powertrain thermal management system 10 turns off only the PTC heater 12 and turns on the EOP 17 and the water pump 13 for the heater according to the first step heating control signal from the controller 110.

When the third signal is received from the determination device 150, the controller 110 may be configured to generate a second step heating control signal for increasing the temperature of the ATF to a second step and transmit the second step heating control signal to the powertrain thermal management system 10. In particular, the second step heating control signal may include an instruction for turning on the PTC heater 12, the EOP 17, and the water pump 13 for the heater. Accordingly, the powertrain thermal management system 10 may be configured to turn on the PTC heater 12, the EOP 17, and the water pump 13 for the heater according to the second step heating control signal from the controller 110. The temperature of the ATF may be rapidly increased as the PTC heater 12, the EOP 17, and the water pump 13 for the heater are all turned on. As a result, the efficiency of the automatic transmission may be prevented from being deteriorated in a low-temperature state.

When performing the second step heating control, the controller 110 may be configured to determine the rate of use of the PTC heater 12 according to the outside-air temperature and the SOC. For example, in response to determining that the outside-air temperature is less than a reference temperature, the controller 110 may be configured to determine the rate of use of the PTC heater 12 to be 100% or a first value close to 100%. Furthermore, when the outside-air temperature is greater than or equal to the reference temperature, the controller 110 may be configured to determine the rate of use of the PTC heater 12 according to the SOC.

For example, when the SOC at the start of battery charging is greater than or equal to a reference value or when the SOC becomes greater than the reference value due to the progress of charging to a certain extent, charging efficiency may be increased, and heat generated from the OBC 11 may be reduced. Accordingly, when the outside-air temperature is greater than or equal to the reference temperature and the SOC of the battery is greater than or equal to the reference value, the controller 110 may be configured to determine the rate of use of the PTC heater 12 to be a second value (e.g., about 66.6%) lower than the first value, and the temperature of the ATF may be increased to the target temperature at a constant rate.

Meanwhile, when the SOC at the start of battery charging is less than the reference value, the efficiency of the OBC 11 at the start of charging is low and thus, a substantial amount of heat is generated, and the charging efficiency remains low due to the use of charging energy when the PTC heater 12 operates. Accordingly, when the outside-air temperature is greater than or equal to the reference temperature and the SOC of the battery is less than the reference value, the controller 110 may be configured to determine the rate of use of the PTC heater 12 to be a third value (e.g., about 33.3%) lower than the second value.

Particularly, it should be understood that the rate of use of the PTC heater 12 may be variously adjusted according to external factors such as the remaining charging time. When the fourth signal is received from the determination device 150, the controller 110 may be configured to generate a heating control off signal for ending the heating control of the ATF and transmit the heating control off signal to the powertrain thermal management system 10. The heating control off signal may include an instruction for turning off the PTC heater 12, the EOP 17, and the water pump 13 for the heater. Accordingly, the powertrain thermal management system 10 may be configured to turn off the PTC heater 12, the EOP 17, and the water pump 13 for the heater according to the heating control off signal from the controller 110. In particular, the current temperature of the ATF may be maintained as the PTC heater 12, the EOP 17, and the water pump 13 for the heater are all turned off.

The ATF temperature control apparatus 100 according to this exemplary embodiment that operates as described above may be implemented in the form of an independent hardware device that includes a memory and a processor for processing each operation, and may be driven in the form included in another hardware device such as a microprocessor or a generic-purpose computer system. Furthermore, the ATF temperature control apparatus 100 according to the present disclosure may be implemented inside the vehicle. In particular, the ATF temperature control apparatus 100 may be integrated with controllers inside the vehicle, or may be implemented as a separate device and may be connected with the control units of the vehicle by separate connecting devices.

Figure 4:
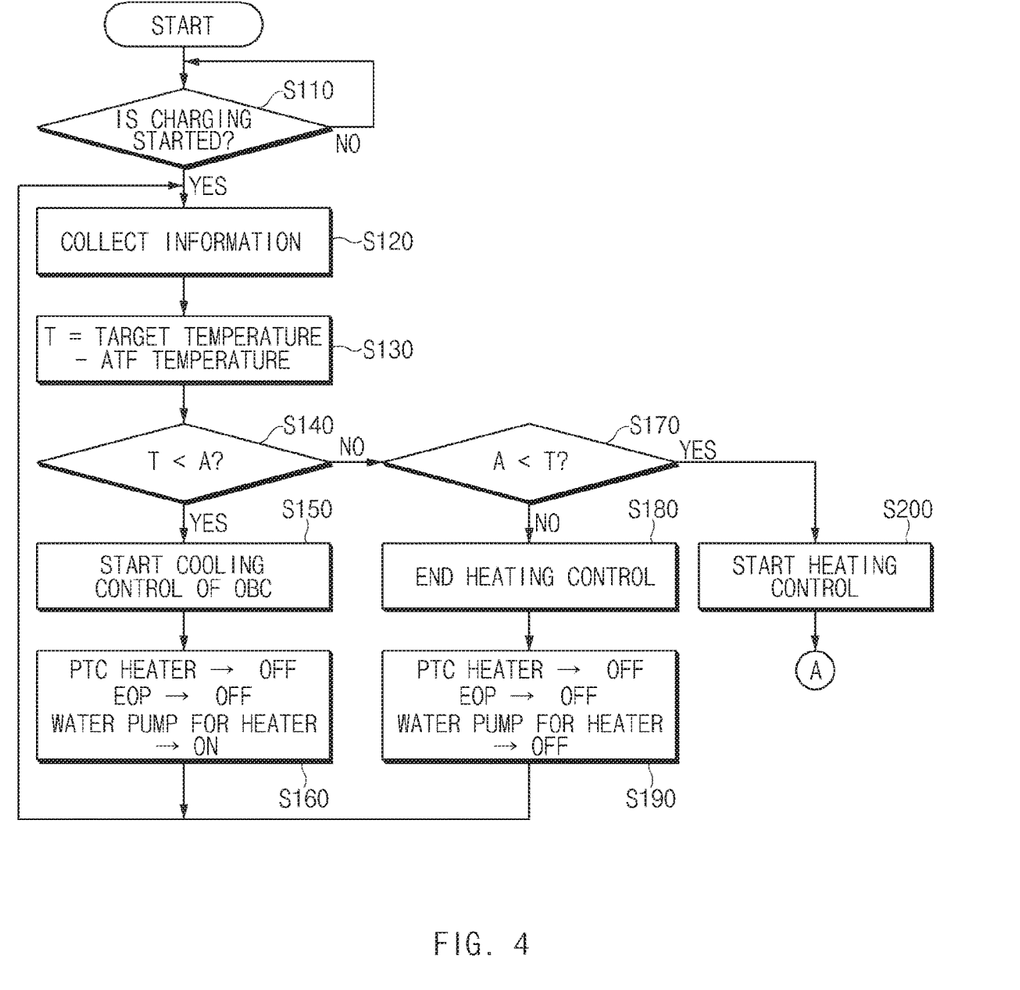
FIGS. 4 and 5 are flowcharts illustrating a method for controlling the temperature of ATF according to an exemplary embodiment of the present disclosure.
Figure 5:
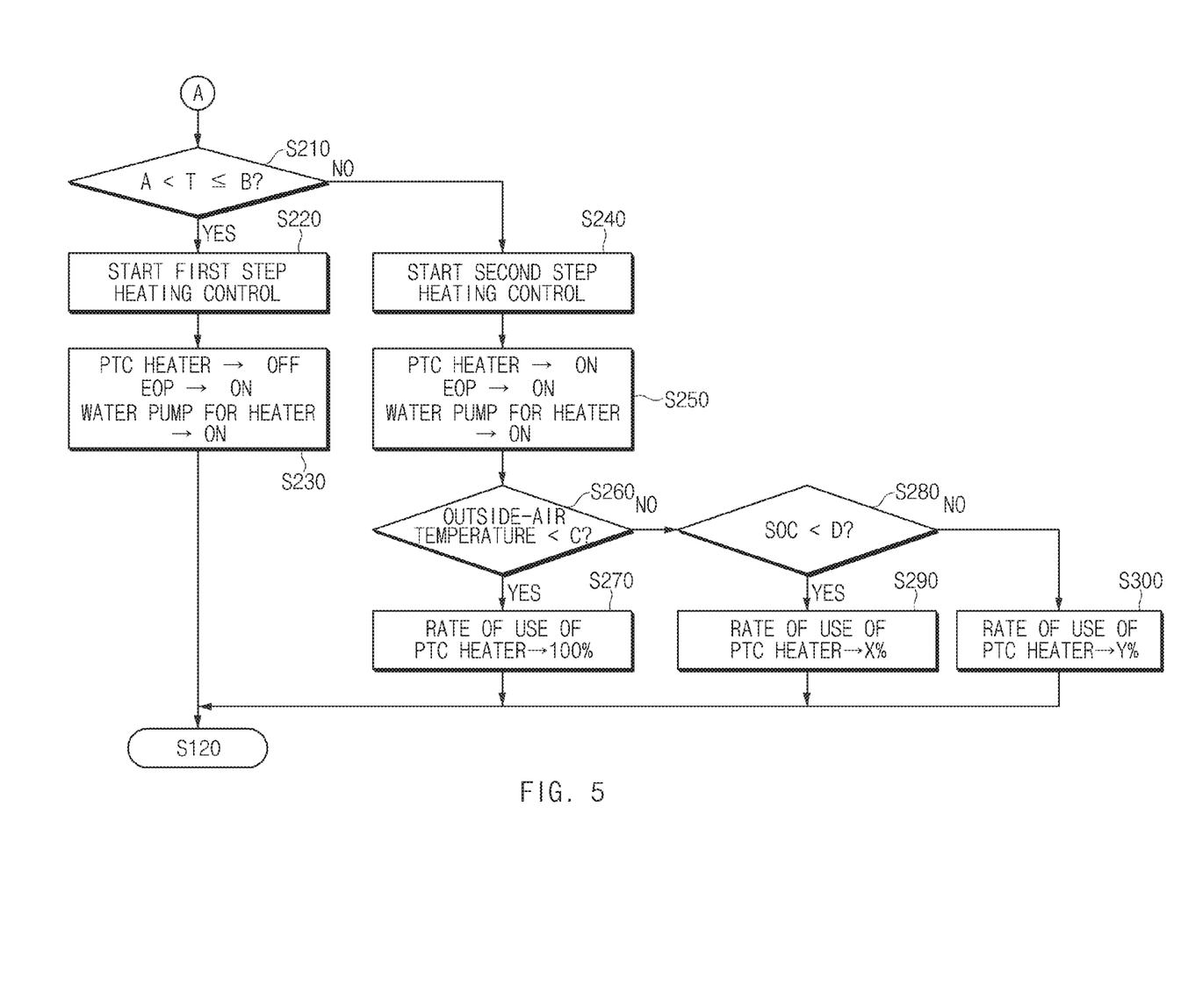

Operations of the above-configured ATF temperature control apparatus 100 according to the present disclosure will be described below in more detail. FIGS. 4 and 5 are flowcharts illustrating a method for controlling the temperature of ATF according to an exemplary embodiment of the present disclosure.

Referring to FIGS. 4 and 5, when the battery of the vehicle starts to be charged (S110), the ATF temperature control apparatus 100 may be configured to collect information such as the temperature of the ATF, an outside-air temperature, and/or SOC information that are required to adjust the temperature of the ATF (S120). The ATF temperature control apparatus 100 may be configured to calculate the temperature difference T between a target temperature of the ATF and the current temperature of the ATF (S130) and compare the calculated temperature difference T with a first set value and a second set value. In response to determining that the temperature difference T is less than the first set value A, the ATF temperature control apparatus 100 may be configured to request the start of cooling control of the OBC 11 to prevent the temperature of the ATF from being increased (S150).

In response to the request of the ATF temperature control apparatus 100, the powertrain thermal management system 10 may be configured to turn off the PTC heater 12 and the EOP 17 and turn on the water pump 13 for the heater to perform cooling control of the OBC 11 (S160). When the temperature difference T corresponds to the first set value A (S140 and S170), the ATF temperature control apparatus 100 may be configured to terminate the heating control of the ATF (S180). The powertrain thermal management system 10 may be configured to turn off the PTC heater 12, the EOP 17, and the water pump 13 for the heater in response to the request of the ATF temperature control apparatus 100 (S190).

Meanwhile, in response to determining that the temperature difference T exceeds the first set value A (S170), the ATF temperature control apparatus 100 may be configured to request the start of heating control to maintain the temperature of the ATF at a predetermined level or increase the temperature of the ATF (S200). In response to determining that the temperature difference T exceeds the first set value A and is less than or equal to a second set value B (S210), the ATF temperature control apparatus 100 may be configured to request the start of a first step heating control operation (S220), and in response to determining that the temperature difference T exceeds the second set value B, the ATF temperature control apparatus 100 may be configured to request the start of a second step heating control operation (S240).

In response to the request of the ATF temperature control apparatus 100 for the start of the first step heating control operation, the powertrain thermal management system 10 may be configured to turn off only the PTC heater 12 and turn on the EOP 17 and the water pump 13 for the heater to perform the first step heating control operation (S230). In response to the request of the ATF temperature control apparatus 100 for the start of the second step heating control operation, the powertrain thermal management system 10 may be configured to turn on the PTC heater 12, the EOP 17, and the water pump 13 for the heater to perform the second step heating control operation (S250). After process S250, the ATF temperature control apparatus 100 may be configured to determine the outside-air temperature and the SOC, and in response to determining that the outside-air temperature is less than a reference temperature (S260), the ATF temperature control apparatus 100 may be configured to determine the rate of use of the PTC heater 12 to be 100% (S270).

Meanwhile, in response to determining that the outside-air temperature is greater than or equal to the reference temperature and the SOC of the battery is less than a reference value (S280), the ATF temperature control apparatus 100 may be configured to determine the rate of use of the PTC heater 12 to be a first value X (S290). When the SOC of the battery is greater than the reference value, the ATF temperature control apparatus 100 may be configured to determine the rate of use of the PTC heater 12 to be a second value Y greater than the first value X (S300).

Figure 6:
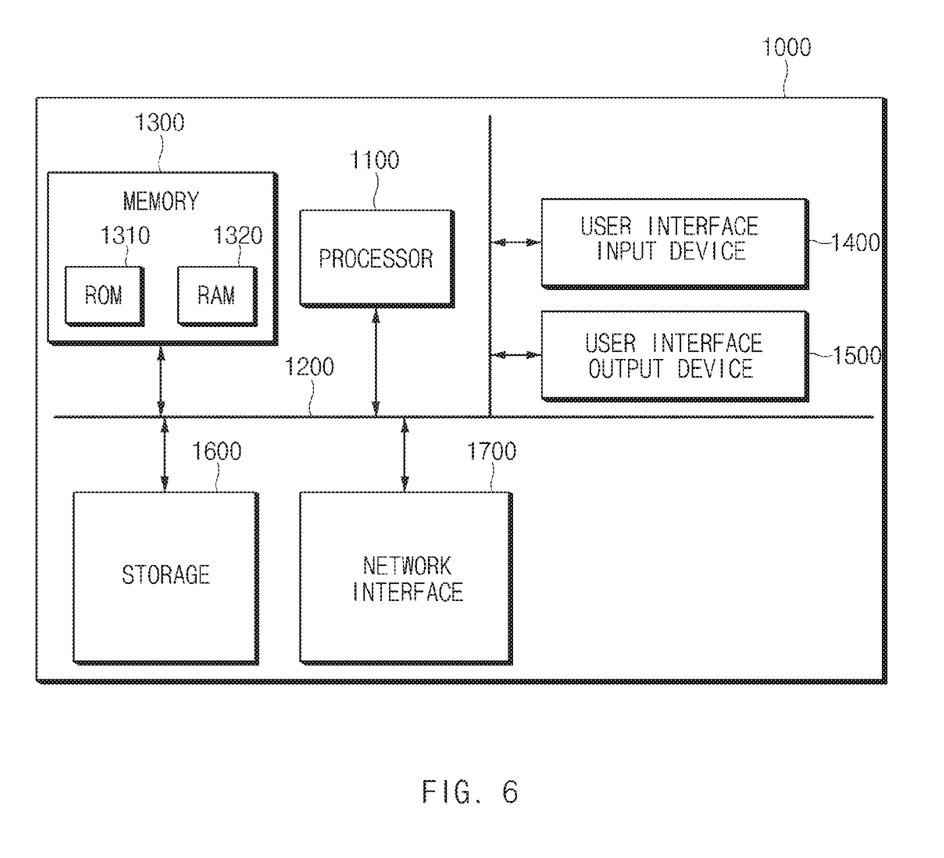
FIG. 6 is a view illustrating a computing system for executing a method according to an exemplary embodiment of the present disclosure.

FIG. 6 is a view illustrating a computing system for executing a method according to an exemplary embodiment of the present disclosure. Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, the on-board charger (OBC) may be mounted in the powertrain thermal management system, and the temperature of the ATF may be increased using heat generated from the OBC during charging, whereby the temperature of the ATF may be increased using minimum energy, and the efficiency of the automatic transmission may be increased when the vehicle travels after the battery thereof is fully charged.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed based on the accompanying claims, and all the technical ideas within the scope equivalent to the claims should be included in the scope of the present disclosure.

What is claimed is:

1. An apparatus for controlling temperature of automatic transmission fluid, comprising:
a determination device configured to determine whether a temperature difference between the temperature of the automatic transmission fluid and a target temperature thereof satisfies a heating control condition of the automatic transmission fluid at the start of charging; and
a controller configured to adjust the temperature of the automatic transmission fluid by outputting an operation control signal for at least one driving unit of a thermal management system, when the temperature difference satisfies the heating control condition of the automatic transmission fluid,
wherein the controller is configured to determine the rate of use of a PTC heater to be a second value lower than a first value, when an outside-air temperature is greater than or equal to a reference temperature and a state of charge is greater than or equal to a reference value.

2. The apparatus of claim 1, wherein the thermal management system is a powertrain thermal management system.

3. The apparatus of claim 2, wherein the powertrain thermal management system includes the positive temperature coefficient (PTC) heater, an electric oil pump (EOP), a water pump, an automatic transmission fluid (ATF) warmer, and an on-board charger (OBC) connected between the PTC heater and the ATF warmer to generate heat during the charging.

4. The apparatus of claim 1, wherein the determination device is configured to determine that a first step heating condition is satisfied, when the temperature difference exceeds a first set value and is less than or equal to a second set value.

5. The apparatus of claim 4, wherein the controller is configured to generate a heating control signal including an instruction for turning off a PTC heater of the thermal management system and turning on an electric oil pump (EOP) and a water pump of the thermal management system, and is configured to transmit the heating control signal to the thermal management system, when the first step heating condition is satisfied.

6. The apparatus of claim 1, wherein the determination device is configured to determine that a second step heating condition is satisfied, when the temperature difference exceeds a second set value.

7. The apparatus of claim 6, wherein the controller is configured to generate a second step heating control signal including an instruction for turning on a PTC heater, an electric oil pump (EOP), and a water pump of the thermal management system and transmit the second step heating control signal to the thermal management system, when the second step heating condition is satisfied.

8. The apparatus of claim 7, wherein the controller is configured to determine a rate of use of the PTC heater according to the outside-air temperature and the state of charge (SOC).

9. The apparatus of claim 8, wherein the controller is configured to determine the rate of use of the PTC heater to be 100% or the first value, when the outside-air temperature is less than the reference temperature.

10. The apparatus of claim 8, wherein the controller is configured to determine the rate of use of the PTC heater to be a third value lower than the second value, when the outside-air temperature is greater than or equal to the reference temperature and the state of charge (SOC) is less than the reference value.

11. The apparatus of claim 1, wherein the determination device is configured to determine that a cooling control condition is satisfied, when the temperature difference is less than a first set value.

12. The apparatus of claim 11, wherein the controller is configured to generate a cooling control signal including an instruction for turning off the PTC heater and an electric oil pump (EOP) of the thermal management system and turning on a water pump of the thermal management system and transmit the cooling control signal to the thermal management system, when the cooling control condition is satisfied.

13. A method for controlling temperature of automatic transmission fluid, comprising:
determining, by a controller, whether a temperature difference between the temperature of the automatic transmission fluid and a target temperature thereof satisfies a heating control condition of the automatic transmission fluid at the start of charging; and
adjusting, by the controller, the temperature of the automatic transmission fluid by outputting an operation control signal for at least one driving unit of a thermal management system, when the temperature difference satisfies the heating control condition of the automatic transmission fluid,
determining, by the controller, a rate of use of a PTC heater to be a second value lower than a first value, when an outside-air temperature is greater than or equal to a reference temperature and a state of charge (SOC) is greater than or equal to a reference value; and
determining, by the controller, the rate of use of the PTC heater to be a third value lower than the second value, when the outside-air temperature is greater than or equal to the reference temperature and the state of charge (SOC) is less than the reference value.

14. The method of claim 13, further comprising:
determining, by the controller, that a first step heating condition is satisfied, when the temperature difference exceeds a first set value and is less than or equal to a second set value; and
determining, by the controller, that a second step heating condition is satisfied, when the temperature difference exceeds the second set value.

15. The method of claim 14, wherein the adjusting of the temperature of the automatic transmission fluid includes:
generating, by the controller, a heating control signal including an instruction for turning off the PTC heater of the thermal management system and turning on an electric oil pump (EOP) and a water pump of the thermal management system; and
transmitting, by the controller, the heating control signal to the thermal management system, when the first step heating condition is satisfied.

16. The method of claim 14, wherein the adjusting of the temperature of the automatic transmission fluid includes:
generating, by the controller, a second step heating control signal including an instruction for turning on the PTC heater, an electric oil pump (EOP), and a water pump of the thermal management system; and
transmitting, by the controller, the second step heating control signal to the thermal management system, when the second step heating condition is satisfied.

17. The method of claim 16, further comprising:

determining, by the controller, the rate of use of the PTC heater according to the outside-air temperature and the state of charge (SOC).

18. The method of claim 17, wherein the determining of the rate of use of the PTC heater includes, determining, by the controller, the rate of use of the PTC heater to be 100% or the first value, when the outside-air temperature is less than the reference temperature.

19. A vehicle system, comprising:

a powertrain thermal management system including a positive temperature coefficient (PTC) heater, an electric oil pump (EOP), a water pump, an automatic transmission fluid (ATF) warmer, and an on-board charger (OBC) connected between the PTC heater and the ATF warmer; and an ATF temperature control apparatus configured to:

determine whether a temperature difference between a temperature of automatic transmission fluid and a target temperature thereof satisfies a heating control condition of the automatic transmission fluid at the start of charging; and adjust the temperature of the automatic transmission fluid by outputting an operation control signal for at least one driving unit of the powertrain thermal management system, when the temperature difference satisfies the heating control condition of the automatic transmission fluid, wherein ATF temperature control apparatus is configured to determine the rate of use of a PTC heater to be a second value lower than a first value, when an outside-air temperature is greater than or equal to a reference temperature and a state of charge is greater than or equal to a reference value.

* * * * *